United States Patent
Miyairi et al.

(10) Patent No.: US 10,480,832 B2
(45) Date of Patent: Nov. 19, 2019

(54) THERMOACOUSTIC ENERGY CONVERTING ELEMENT PART AND THERMOACOUSTIC ENERGY CONVERTER

(71) Applicant: NGK Insulators, Ltd., Nagoya-Shi (JP)

(72) Inventors: Yukio Miyairi, Nagoya (JP); Shinichi Miwa, Tagimi (JP)

(73) Assignee: NGK Insulators, Ltd., Nagoya (JP)

(*) Notice: Subject to any disclaimer, the term of this patent is extended or adjusted under 35 U.S.C. 154(b) by 482 days.

(21) Appl. No.: 14/722,257

(22) Filed: May 27, 2015

(65) Prior Publication Data

US 2015/0253043 A1    Sep. 10, 2015

Related U.S. Application Data

(63) Continuation of application No. PCT/JP2014/084209, filed on Dec. 25, 2014.

(30) Foreign Application Priority Data

Jan. 31, 2014    (JP) .................. 2014-016903

(51) Int. Cl.
F25B 9/14    (2006.01)

(52) U.S. Cl.
CPC ...... F25B 9/145 (2013.01); *F25B 2309/1402* (2013.01); *F25B 2309/1404* (2013.01);
(Continued)

(58) Field of Classification Search
CPC ... F25B 2309/1402–1412; F03G 7/002; B23K 20/023; B32B 2038/0016
See application file for complete search history.

(56) References Cited

U.S. PATENT DOCUMENTS 6,284,425 B1 * 9/2001 Staral .................. B41M 5/42
                                                 430/200
7,655,195 B1 * 2/2010 Ichikawa ........... B01D 46/2451
                                                 422/180
(Continued)

FOREIGN PATENT DOCUMENTS

JP    2004-028389 A1    1/2004
JP    2008-101910 A1    5/2008
(Continued)

OTHER PUBLICATIONS

International Search Report and Written Opinion (Application No. PCT/JP2014/084209) dated Mar. 31, 2015.
(Continued)

*Primary Examiner* — Keith M Raymond
*Assistant Examiner* — Webeshet Mengesha
(74) *Attorney, Agent, or Firm* — Burr & Brown, PLLC

(57) ABSTRACT

The thermoacoustic energy converting element part is provided with a plurality of through holes extending along a direction to penetrate the thermoacoustic energy converting element part to form travelling routes of acoustic waves. The thermoacoustic energy converting element part includes a wall surrounding each of the through holes to extend in an extending direction of the through hole and configured to exchange heat with the fluid. The through hole includes a hole that has a hydraulic diameter of 0.4 mm or smaller, and an open area ratio of the through holes in the thermoacoustic energy converting element part is 60% or higher. Thermal conductivity of the thermoacoustic energy converting element part in fluid atmosphere is 0.4 W/m/K or lower, and heat capacity of the thermoacoustic energy converting element part at 400° C. in the fluid atmosphere is higher than 0.5 J/cc/K.

17 Claims, 5 Drawing Sheets

(52) U.S. Cl.
CPC ............... *F25B 2309/1405* (2013.01); *F25B 2309/1407* (2013.01); *F25B 2309/1415* (2013.01)

(56) References Cited

U.S. PATENT DOCUMENTS

| | | | |
|---|---|---|---|
| 2004/0231341 A1 | 11/2004 | Smith | |
| 2008/0034719 A1* | 2/2008 | Han | F01N 3/035 55/524 |
| 2008/0110180 A1 | 5/2008 | Watanabe et al. | |
| 2010/0130345 A1* | 5/2010 | Hara | C04B 35/593 501/97.4 |
| 2011/0121583 A1 | 5/2011 | Asturias et al. | |
| 2011/0259003 A1 | 10/2011 | Yamamoto | |
| 2012/0250908 A1* | 10/2012 | Jiang | H04R 23/002 381/164 |
| 2013/0150644 A1* | 6/2013 | Keusenkothen | C07C 4/04 585/650 |
| 2013/0270936 A1* | 10/2013 | Mayor | H02K 9/19 310/54 |

FOREIGN PATENT DOCUMENTS

| | | |
|---|---|---|
| JP | 2012-229892 A1 | 11/2012 |
| JP | 2012-237295 A1 | 12/2012 |
| JP | 2012237295 * | 12/2012 ............... F03G 7/00 |

OTHER PUBLICATIONS

German Office Action (Application No. 11 2014 000 296.8) dated Mar. 16, 2017 (with English translation).

* cited by examiner ( ⚡ HEAT TRANSFER)

THERMOACOUSTIC ENERGY CONVERTING ELEMENT PART AND THERMOACOUSTIC ENERGY CONVERTER

TECHNICAL FIELD

The present invention relates to a thermoacoustic energy converting element part that converts acoustic energy into thermal energy or converts thermal energy into acoustic energy between the fluid, through which acoustic waves travel, and a wall in contact with the fluid, and a thermoacoustic energy converter.

BACKGROUND ART

At present, from the viewpoint of conservation of the global environment, a technique is desired which can efficiently utilize the energy that used to be wasted. In particular, a technique which can convert the energy that used to be wasted into mechanical energy is desired. For example, a Rankine bottoming cycle which generates steam to rotate a turbine, a Sterling cycle system using waste heat, a thermoelectric conversion system using a thermoelectric conversion element, and a thermoacoustic system converting thermal energy into sound pressure energy are known.

The thermoacoustic system uses a thermoacoustic conversion technique of exchanging energy between acoustic energy (hereinafter, also referred to as sound pressure energy) and thermal energy. The system uses a compression process and an expansion process in a fluid element of a fluid in which acoustic waves travel. Specifically, the technique uses the behavior of the compression process and the expansion process in the fluid element taking place at different locations (along the travelling direction of acoustic waves) for different longitudinal oscillations (acoustic waves).

Example thermoacoustic systems using the thermoacoustic conversion technique include a system with an apparatus having a sufficient contact area between a solid part and gas, where one end of the solid part is heated and a portion of heat is converted into acoustic energy which is supplied to the generator. The key feature of the system is the temperature gradient in the solid part of the apparatus, though the efficiency of converting energy into acoustic wave energy is disadvantageously low. The disadvantage is due to an undesirable structure and property of the thermoacoustic energy converting element part configured to convert thermal energy into sound pressure energy.

As an example of the thermoacoustic energy converting element part employing the thermoacoustic conversion technique, a thermoacoustic stack is known that is made compact to generate self-excited oscillation even with high frequency under low temperature difference (Patent Literature 1).

The thermoacoustic stack includes a plurality of through holes and is made of a material having thermal conductivity lower than 10 W/m-K. For a shorter stack length, the temperature gradient can be scaled down (proportionally reduced) so that the temperature at a high temperature side heat exchanging unit, which is required to generate a critical temperature gradient, can be reduced.

CITATION LIST

Patent Literature

Patent Literature 1: JP 2012-237295 A

SUMMARY OF INVENTION

Technical Problem

By using the aforementioned stack, the required temperature for the high temperature side heat exchanging unit to achieve the critical temperature gradient can efficiently be reduced. At present, however, the efficiency of energy conversion between acoustic waves and heat is low.

An object of the present invention is to provide a thermoacoustic energy converting element part that can efficiently convert from acoustic wave energy to heat energy or from heat energy to acoustic wave energy between the fluid, through which acoustic waves travel, and a wall in contact with the fluid, and a thermoacoustic energy converter.

A present technology includes various aspects as mentioned below.

(Aspect 1)

A thermoacoustic energy converting element part that converts acoustic energy into thermal energy or thermal energy into acoustic energy between a fluid, through which acoustic waves travel, and a wall in contact with the fluid. The thermoacoustic energy converting element part includes a wall extendingly surrounding each of a plurality of through holes and configured to exchange heat with the fluid, the plurality of through holes penetrating the thermoacoustic energy converting element part to extend in a direction and serving as travelling routes of acoustic waves, wherein the through hole includes a through hole having a hydraulic diameter of 0.4 mm or smaller, an open area ratio of the plurality of through holes in the thermoacoustic energy converting element part is 60% or higher, thermal conductivity of the thermoacoustic energy converting element part in fluid atmosphere is 0.4 W/m/K or lower, and heat capacity of the thermoacoustic energy converting element part at 400° C. in the fluid atmosphere is higher than 0.5 J/cc/K.

(Aspect 2)

The thermoacoustic energy converting element part according to aspect 1, wherein thermal expansion along an extending direction of the through hole in the thermoacoustic energy converting element part under temperature from 20 to 800° C. is 6 ppm/K or lower.

(Aspect 3)

The thermoacoustic energy converting element part according to aspect 1 or 2, wherein a cross section of each of the through holes in the thermoacoustic energy converting element part taken perpendicular to the extending direction of the through hole has a polygonal shape.

(Aspect 4)

The thermoacoustic energy converting element part according to aspect 1 or 2, wherein an inner face of the wall facing the through hole is provided with a rib extending along the extending direction of the through hole and protrudes inward in a cross sectional view of the through hole.

(Aspect 5)

The thermoacoustic energy converting element part according to any one of aspects 1 to 4, wherein heat capacity of the thermoacoustic energy converting element part at 400° C. in the fluid atmosphere is 0.75 J/cc/K or higher.

(Aspect 6)

The thermoacoustic energy converting element part according to any one of aspects 1 to 5 configured as a single structure.

(Aspect 7)

The thermoacoustic energy converting element part according to any one of aspects 1 to 5, the part being configured as an elongated single structure formed of a single material and including a partition wall parting through holes each serving as a flow path extending from one end to another end of the thermoacoustic energy converting element part.

(Aspect 8)

The thermoacoustic energy converting element part according to any one of aspects 1 to 7, wherein the thermoacoustic energy converting element part is made of a material containing 80% or higher by mass of a component selected from cordierite, mullite, aluminum titanate, alumina, zirconia, silicon nitride, silicon carbide, and synthetic resin.

(Aspect 9)

A thermoacoustic energy converter configured to amplify acoustic wave energy in a fluid using heat of a wall in contact with the fluid. The thermoacoustic energy converter includes:

a thermoacoustic energy converting element part;

a guide tube forming a travelling route of acoustic waves travelling in the fluid and configured to guide the acoustic waves to through holes in the thermoacoustic energy converting element part so as the acoustic waves travel along an extending direction of the through holes; and a pair of heat exchanging units provided on both ends of the thermoacoustic energy converting element part and configured to generate temperature gradient along the extending direction between both ends of the thermoacoustic energy converting element part.

In the thermoacoustic energy converter, the guide tube includes an output end which is configured to output acoustic waves having sound pressure energy amplified by using the temperature gradient and to be coupled to a converter configured to convert resulting amplified sound pressure energy of output acoustic waves into other form of energy, the thermoacoustic energy converting element part includes a wall extendingly surrounding each of a plurality of the through holes and configured to exchange heat with the fluid, the plurality of through holes penetrating the thermoacoustic energy converting element part to extend in a direction and serving as travelling routes of acoustic waves, the through holes include a through hole that has a hydraulic diameter of 0.4 mm or smaller, an open area ratio of the plurality of the through holes in the thermoacoustic energy converting element part is 60% or higher, thermal conductivity of the thermoacoustic energy converting element part in fluid atmosphere is 0.4 W/m/K or lower, and heat capacity of the thermoacoustic energy converting element part at 400° C. in the fluid atmosphere is higher than 0.5 J/cc/K.

(Aspect 10)

A thermoacoustic energy converter configured to generate temperature gradient on a wall in contact with a fluid by using acoustic wave energy in the fluid. The thermoacoustic energy converter includes:

a thermoacoustic energy converting element part;

a guide tube forming a travelling route of acoustic waves travelling in the fluid and configured to guide the acoustic waves to through holes in the thermoacoustic energy converting element part so as the acoustic waves travel along an extending direction of the through holes; and a heat exchanging units provided on a first end of the thermoacoustic energy converting element part and kept at a constant temperature; and a heat output unit provided on a second end of the thermoacoustic energy converting element part and configured to provide a temperature different from the temperature of the heat exchanging unit by using a temperature gradient generated in the thermoacoustic energy converting element part between the heat exchanging unit and the heat output unit by travelling of the acoustic waves.

In the thermoacoustic energy converter, the thermoacoustic energy converting element part includes a wall extendingly surrounding each of a plurality of the through holes and configured to exchange heat with the fluid, the plurality of the through holes penetrating the thermoacoustic energy converting element part to extend in a direction and forming travelling routes of acoustic waves, the through holes include a through hole that has a hydraulic diameter of 0.4 mm or smaller, an open area ratio of the plurality of the through holes in the thermoacoustic energy converting element part is 60% or higher, thermal conductivity of the thermoacoustic energy converting element part in fluid atmosphere is 0.4 W/m/K or lower, and heat capacity of the thermoacoustic energy converting element part at 400° C. in the fluid atmosphere is higher than 0.5 J/cc/K.

Advantageous Effects of Invention

The thermoacoustic energy converting element part and the thermoacoustic energy converter according to the aforementioned aspect can perform efficient energy conversion from acoustic wave energy to heat energy or from heat energy to acoustic wave energy between the fluid, through which acoustic waves travel, and the wall in contact with the fluid.

DESCRIPTION OF EMBODIMENTS

A thermoacoustic energy converting element part and a thermoacoustic energy converter according to an embodiment will be described in detail.

(Thermoacoustic Energy Converter 10)

Figure 1:
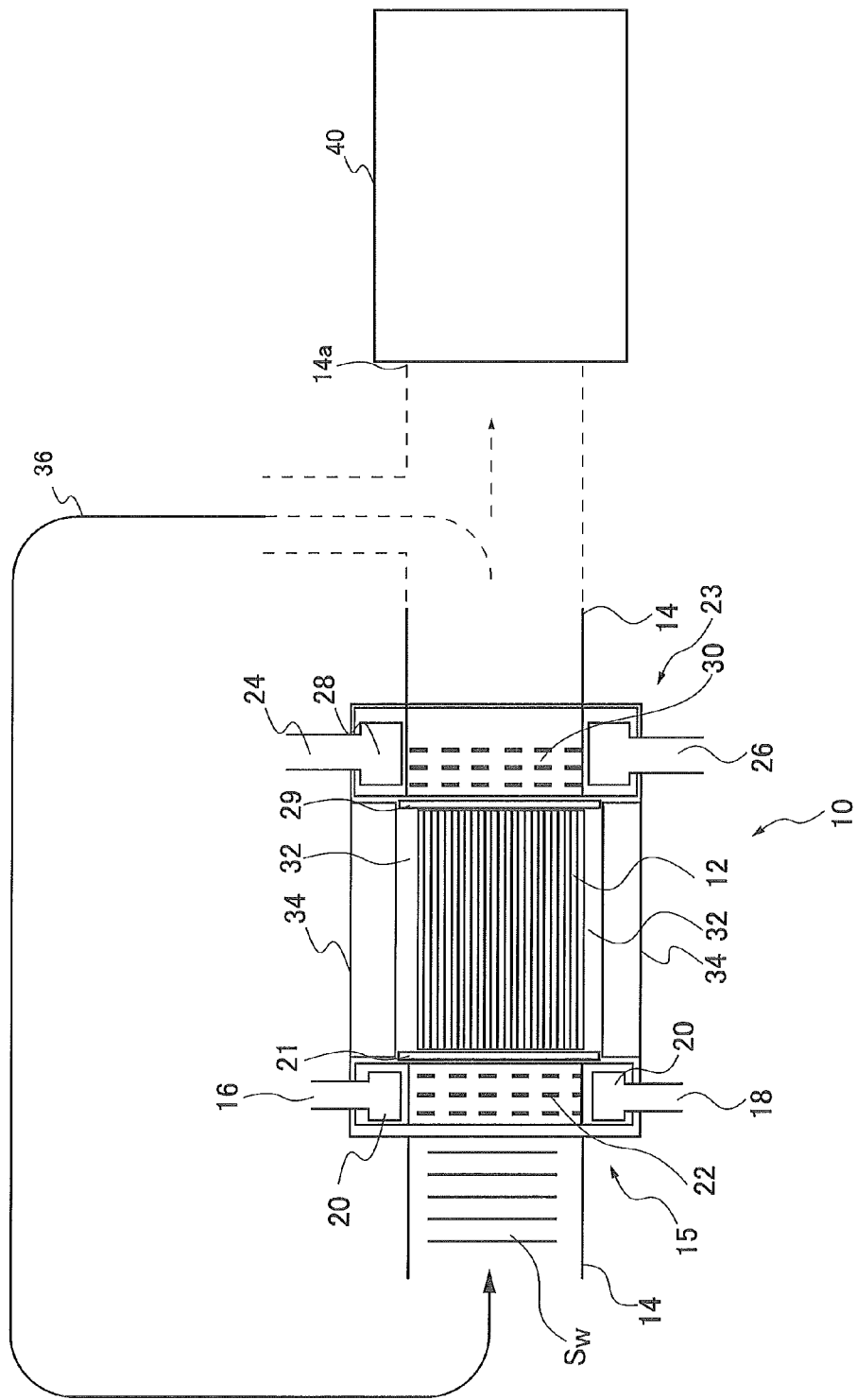
FIG. 1 illustrates an example configuration of a thermoacoustic energy converter according to an embodiment in which a thermoacoustic energy converting element part according to the embodiment is used.

FIG. 1 illustrates an example configuration of a thermoacoustic energy converter 10 in which a thermoacoustic energy converting element part according to an embodiment is used. The thermoacoustic energy converter 10 illustrated in FIG. 1 is an apparatus configured to amplify the sound pressure energy of acoustic waves travelling in a guide tube and to covey the amplified sound pressure energy to a converting unit 40 that converts the amplified sound pressure energy into other form of energy. The converting unit 40 may be, for example, a generator configured to convert sound pressure energy into electrical energy or an apparatus configured to convert sound pressure energy into thermal energy. The generator generates electromagnetic induction to produce electromotive force by oscillating a coil or a magnet, or a power generating element, by acoustic waves. The converting unit that converts acoustic wave energy into thermal energy is used, for example, as a cooling device that provides a cooling medium cooled by absorbing heat with acoustic waves.

The thermoacoustic energy converter 10 is an apparatus that amplifies the sound pressure energy of an entering acoustic wave Sw in the thermoacoustic energy converting element part and outputs the resulting acoustic wave having amplified sound pressure energy. The thermoacoustic energy converter 10 can output acoustic waves having significantly large sound pressure energy by, for example, amplifying the small sound pressure energy of the acoustic wave Sw in the thermoacoustic energy converting element part and repeating this amplification by circulating and inputting the acoustic waves having amplified sound pressure energy to the thermoacoustic energy converting element part. In an initial stage where the acoustic wave Sw having small sound pressure energy is generated, the thermoacoustic energy converter 10 selectively amplifies a portion of noises in the sound in the guide tube 14 that has a frequency determined by the shape and dimensions of the thermoacoustic energy converter 10. Thus, the acoustic wave Sw having small sound pressure energy is generated by self-oscillation.

As illustrated in FIG. 1, the thermoacoustic energy converter 10 includes a thermoacoustic energy converting element part 12, the guide tube 14, and heat exchanging units 15 and 23 as main parts.

The thermoacoustic energy converting element part 12 converts energy between acoustic waves and heat, between the fluid, in which the acoustic wave Sw travels, and the wall in contact with the fluid. The thermoacoustic energy converting element part 12 includes a plurality of tubular through holes extending in a direction to form travelling routes of the acoustic wave Sw as will be described below. The thermoacoustic energy converting element part 12 is formed in a pillar shape, such as a column or a square pillar, and provided with a large number of through holes extending along the axis of the pillar so as to be in parallel to each other. The thermoacoustic energy converting element part 12 is made of, for example, metal, ceramics, or resin.

The guide tube 14 contains a fluid and forms a travelling route of the acoustic wave Sw travelling in the fluid. The guide tube 14 guides the acoustic wave Sw to the through holes so that the acoustic wave Sw travels along the extending direction of the through hole in the thermoacoustic energy converting element part 12. The guide tube 14 is, for example, a metal tube. For the fluid contained in the guide tube 14, gases are preferably used, for example, hydrogen gas or helium gas. The gas is hermetically contained in the guide tube 14 and controlled to a certain at pressure, for example, from a few atmospheric pressure to a few tens of atmospheric pressure, specifically, 21 to 40 atmospheric pressure. As illustrated in dashed lines in FIG. 1, the guide tube 14 forms a circulation path 36 in which the acoustic wave Sw circulates through the thermoacoustic energy converting element part 12. The guide tube 14 includes an output end 14a coupled to the converting unit 40 that converts the amplified acoustic wave energy in the acoustic wave Sw into another form of energy other than sound pressure energy. Although the guide tube 14 forms the circulation path 36 in the embodiment, the guide tube 14 may not form a circulation path.

The heat exchanging unit 15 is a low temperature portion provided to one of ends of the thermoacoustic energy converting element part 12 to keep the end of the thermoacoustic energy converting element part 12 at a low temperature. Hereinafter, the heat exchanging unit 15 is referred to as, with the same reference sign, low temperature portion 15. The heat exchanging unit 23 is a high temperature portion provided to the other end of the thermoacoustic energy converting element part 12 to keep the other end of the thermoacoustic energy converting element part 12 at a high temperature. Hereinafter, the heat exchanging unit 23 is referred to as, with the same reference sign, high temperature portion 23. With the low temperature portion 15 and the high temperature portion 23, a temperature gradient is generated between both ends of the thermoacoustic energy converting element part 12 along the walls of the through holes provided in the thermoacoustic energy converting element part 12, that is, along the extending direction of the through holes.

The low temperature portion 15 includes a supply tube 16 for supplying a low temperature medium, such as gas or liquid, to the low temperature portion 15, an ejection tube 18 for ejecting the medium from the low temperature portion 15, and an annular tube 20 provided between the supply tube 16 and the ejection tube 18 to annularly surround the travelling route of the acoustic wave Sw. The supply tube 16 is coupled to a cold source (not illustrated). The annular tube 20 is coupled to the supply tube 16 and the ejection tube 18. The annular tube 20 is in contact with a metal member 21 having high thermal conductivity. The metal member 21 is in contact with the thermoacoustic energy converting element part 12. The heat exchanged at the end of the thermoacoustic energy converting element part 12 via the metal member 21 flows from the end of the thermoacoustic energy converting element part 12 to the low temperature portion 15. In this manner, the end of the thermoacoustic energy converting element part 12 in contact with the metal member 21 is cooled. The low temperature portion 15 has a cooling fin 22 to cool the fluid contained in the guide tube 14. The cooling fin 22 coupled to the annular tube 20 absorbs heat from the fluid at the low temperature portion 15 to reduce the temperature of the fluid.

The high temperature portion 23 includes a supply tube 24 for supplying a high temperature medium such as gas or liquid to the high temperature portion 23, an ejection tube 26 for ejecting the medium from the high temperature portion 23, and an annular tube 28 provided between the supply tube 24 and the ejection tube 26 to annularly surround the travelling route of the acoustic wave Sw. The supply tube 24 is coupled to a hot source (not illustrated). The annular tube 28 is coupled to the supply tube 24 and the ejection tube 26. The annular tube 28 is in contact with a metal member 29 having high thermal conductivity. The metal member 29 is in contact with the thermoacoustic energy converting element part 12. The heat is exchanged between the end of the thermoacoustic energy converting element part 12 and the high temperature portion 23 via the metal member 29, and the end of the thermoacoustic energy converting element part 12 is heated with heat flowing from the high temperature portion 23. The high temperature portion 23 has a heating fin 30 to heat the fluid contained in the guide tube 14. The heating fin 30 coupled to the annular tube 28 supplies heat to the fluid at the high temperature portion 23 to raise the temperature of the fluid at the heating fin 30.

An insulation member 32 is provided on the outer periphery of the thermoacoustic energy converting element part 12 to suppress heat transfer from the thermoacoustic energy converting element part 12. A casing 34 is provided on the outer periphery of the insulation member 32 with a gap in between.

The thermoacoustic energy converting element part 12 can thus keep the temperature gradient generated by the low temperature portion 15 and the high temperature portion 23. The effect of the thermoacoustic energy converting element part 12 of the thermoacoustic energy converter 10 will be described below.

(Thermoacoustic Energy Converter 110)

Figure 2:
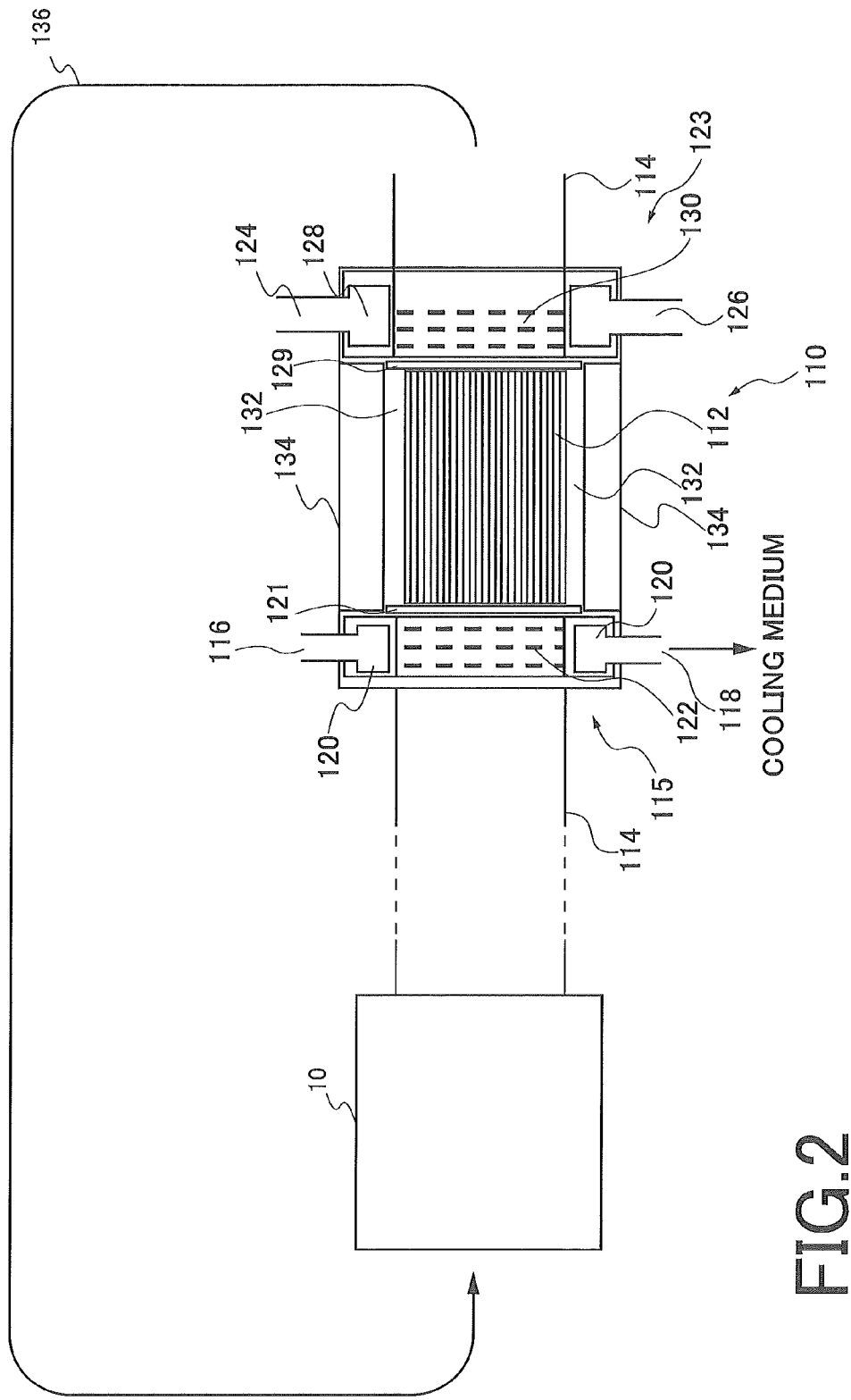
FIG. 2 illustrates an example configuration of a thermoacoustic energy converter according to another embodiment different from the thermoacoustic energy converter illustrated in FIG. 1.

FIG. 2 illustrates an example configuration of a thermoacoustic energy converter 110 according to another embodiment different from the thermoacoustic energy converter 10. The thermoacoustic energy converter 110 illustrated in FIG. 2 is an apparatus configured to convert sound pressure energy of acoustic waves travelling in the guide tube into thermal energy.

As illustrated in FIG. 2, the thermoacoustic energy converter 110 includes a thermoacoustic energy converting element part 112, a guide tube 114, a heat exchanging unit 123, and a heat output unit 115 as main parts. The heat output unit 115 provides a temperature different from that of the heat exchanging unit 123, in other words, the heat output unit 115 outputs a cooled medium (gas or liquid) for cooling.

The thermoacoustic energy converter 110 is coupled, via the guide tube 114, to the thermoacoustic energy converter 10 which outputs acoustic waves. The thermoacoustic energy converter 110 according to the embodiment is coupled to the thermoacoustic energy converter 10, although the thermoacoustic energy converter 110 may be coupled to other devices that generate acoustic waves.

The guide tube 114 and the heat exchanging unit 123 have the configuration identical to the guide tube 14 and the heat exchanging unit 23 illustrated in FIG. 1, respectively.

The guide tube 114 contains a fluid and forms a travelling route of acoustic waves travelling in the fluid. The guide tube 114 guides the acoustic waves to the through holes in the thermoacoustic energy converting element part 112 so that the acoustic waves travel along the extending direction of the through holes. The guide tube 114 is, for example, a metal tube. For the fluid contained in the guide tube 114, gases are used, for example, hydrogen gas or helium gas. The gas is hermetically contained in the guide tube 114 and controlled to a certain pressure of, for example, a few atmospheres to a few tens of atmospheres. As illustrated in FIG. 2, the guide tube 114 forms a circulation path 136 in which acoustic waves circulate through the thermoacoustic energy converting element part 112. Although the guide tube 114 forms the circulation path 136 in the embodiment, the guide tube 114 may not form a circulation path.

The heat exchanging unit 123 includes a supply tube 124 for supplying a constant-temperature medium such as gas or liquid to the heat exchanging unit 123, an ejection tube 126 for ejecting the medium from the heat exchanging unit 123, and an annular tube 128 provided between the supply tube 124 and the ejection tube 126 to annularly surround the travelling route of acoustic waves. The supply tube 124 is coupled to a heat source kept at a constant temperature (not illustrated). The annular tube 128 is coupled to the supply tube 124 and the ejection tube 126. The annular tube 128 is in contact with a metal member 129 having high thermal conductivity. The metal member 129 is in contact with the thermoacoustic energy converting element part 112. Heat is exchanged, via the metal member 129, between one end of the thermoacoustic energy converting element part 12 and the heat exchanging unit 123, and the temperature at the end of the thermoacoustic energy converting element part 112 becomes identical to the temperature of the heat exchanging unit 123. The heat exchanging unit 123 has a fin 130 to keep the fluid contained in the guide tube 114 at a constant temperature. The fin 130 coupled to the annular tube 128 supplies heat to the fluid at the heat exchanging unit 123 to keep the fluid at the fin 130 at a certain temperature.

An insulation member 132 is provided on the outer periphery of the thermoacoustic energy converting element part 112 to suppress heat transfer from the thermoacoustic energy converting element part 112. A casing 134 is provided on the outer periphery of the insulation member 132 with a gap in between. The thermoacoustic energy converting element part 112 can thus keep the temperature gradient generated by acoustic waves. The effect of the thermoacoustic energy converting element part 112, which performs conversions between acoustic waves and heat, of the thermoacoustic energy converter 110 will be described below.

The heat output unit 115 is provided at one of ends of the thermoacoustic energy converting element part 112. By using the temperature gradient generated in the thermoacoustic energy converting element part 112 by the travelling acoustic waves, the heat output unit 115 provides a temperature different from that of the heat exchanging unit 123. The temperature gradient is formed between the heat output unit 115 and the heat exchanging unit 123 which is kept at a constant temperature.

The heat output unit 115 includes a supply tube 116 for supplying a medium such as gas or liquid, an ejection tube 118 for ejecting the medium from the heat output unit 115, and an annular tube 120 provided between the supply tube 116 and the ejection tube 118 to annularly surround the travelling route of acoustic waves. The annular tube 120 is coupled to the supply tube 116 and the ejection tube 118. The annular tube 120 is in contact with a metal member 121 having high thermal conductivity. The metal member 121 is in contact with the thermoacoustic energy converting element part 112. The annular tube 120 exchanges heat with an end of the thermoacoustic energy converting element part 112 via the metal member 121, and the heat flows from the heat output unit 115 to the end of the thermoacoustic energy converting element part 112, thereby cooling the annular tube 120. The medium flowing in the annular tube 120 is output as a cooing medium. The cooling medium is used in devices for cooling. The heat output unit 115 has a cooling fin 122 to cool the fluid contained in the guide tube 114. The cooling fin 122 coupled to the annular tube 120 absorbs heat in the fluid at the heat output unit 115 to reduce the temperature of the fluid.

In the thermoacoustic energy converter 110, the thermoacoustic energy converting element part 112 converts the sound pressure energy of acoustic waves into thermal energy. The effect of the thermoacoustic energy converting element part 12 and the thermoacoustic energy converting element part 112, that is, the conversion between sound pressure energy and thermal energy will be described below.

(Thermoacoustic Energy Converting Element Part)

Figure 3:
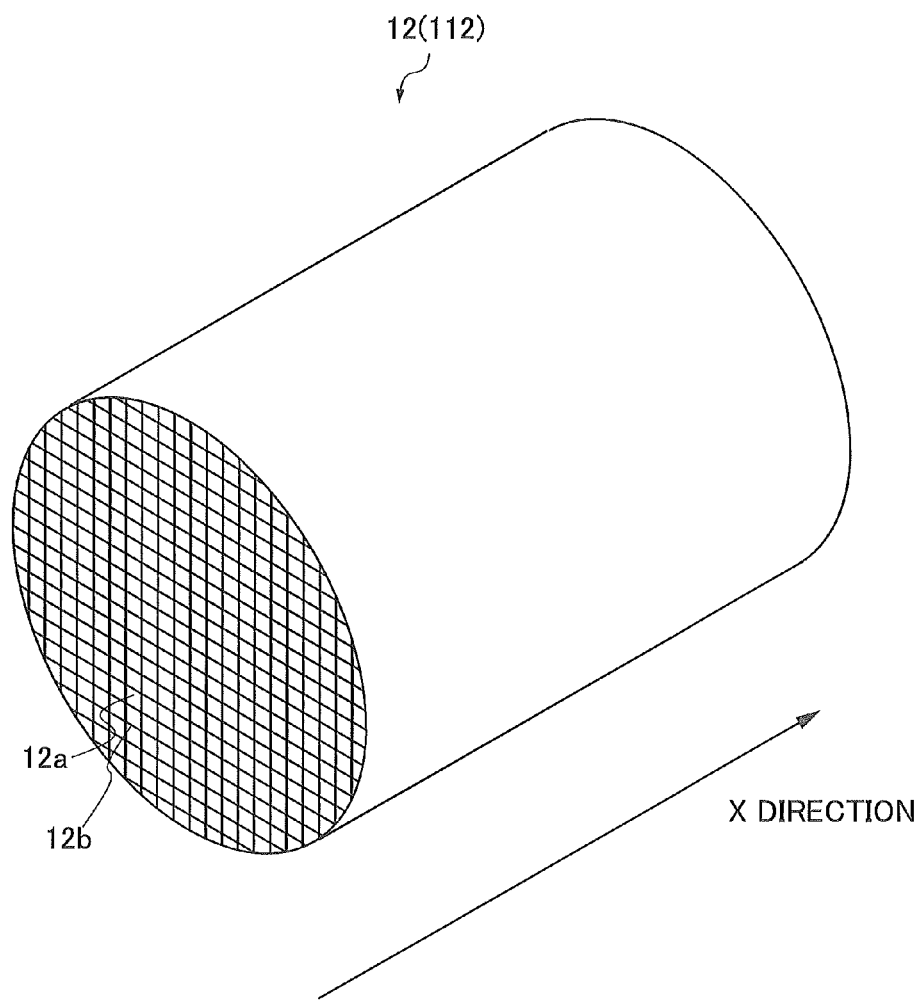
FIG. 3 is an external perspective view of an example thermoacoustic energy converting element part according to the embodiment.

Since the thermoacoustic energy converting element part 12 and the thermoacoustic energy converting element part 112 have the identical configuration, the thermoacoustic energy converting element part 12 will representatively be described. FIG. 3 is an external perspective view of the thermoacoustic energy converting element part 12.

The thermoacoustic energy converting element part 12 includes a plurality of through holes 12a extending along a direction to penetrate the thermoacoustic energy converting element part 12 to form travelling routes of acoustic waves. The thermoacoustic energy converting element part 12 has a wall 12b surrounding each of the plurality of through holes 12a and extending along the extending direction of the through holes 12a (along X direction in FIG. 3). The wall 12b exchanges heat with a fluid as will be described later. In FIG. 3, the wall 12b is simply illustrated in lines. The thermoacoustic energy converting element part 12 is preferably provided as a single part. The single part is a single structural part. A stack of a plurality of structures, such as pipes, is not a single part. The thermoacoustic energy converting element part 12 is preferably provided as an elongated structure configured as a single structure, or a single part, of a single material including partition walls parting through holes each serving as a flow path extending from one end to the other end of the thermoacoustic energy converting element part 12. This structure is provided with through holes 12a having a uniform cross section and a thin wall 12b surrounding the through hole 12a. The elongated structure is preferably made of a single and uniform material. For example, the thermoacoustic energy converting element part 12 may be formed by extrusion molding in which the material is extruded along the extending direction of the through holes 12a.

The length of the thermoacoustic energy converting element part 12 in X direction is determined corresponding to the wavelength of acoustic waves generated in the guide tube 14 or the longitudinal oscillatory displacement of fluid. For example, the length is preferably 10 mm or longer and shorter than 500 mm. The length within this range is identical to the displacement of the longitudinal oscillation of a fluid element generated by acoustic waves, and thus the energy conversion can be performed efficiently. The frequency of acoustic waves is, for example, 50 Hz to 200 kHz but is not particularly limited.

Figure 4A:
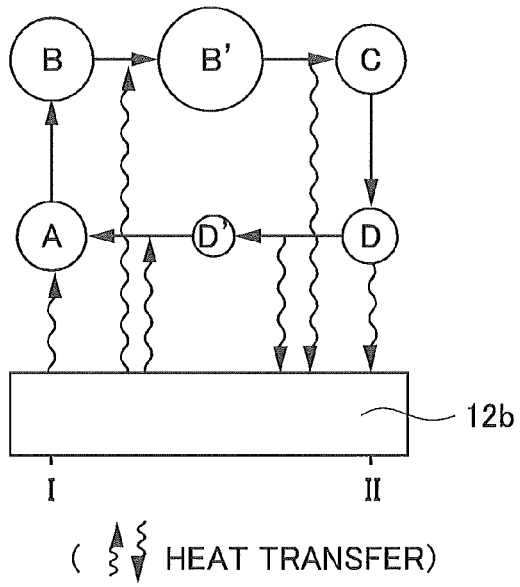
FIGS. 4A and 4B explain conversion between sound pressure energy and thermal energy in the thermoacoustic energy converting element part.
Figure 4B:
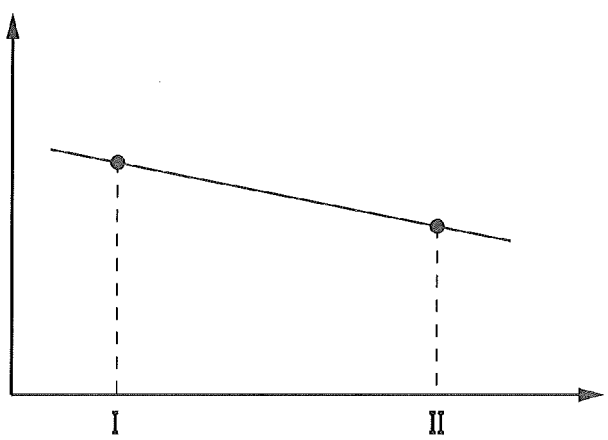

FIGS. 4A and 4B explain conversion between sound pressure energy and thermal energy and heat transfer between the wall 12b and the fluid performed in the thermoacoustic energy converting element part 12.

The fluid is a medium in which acoustic waves travel and longitudinally oscillates. The relation between the displacement of the fluid and compression as well as expansion of the fluid caused by the longitudinal oscillation will be explained for a fluid element which is a very small portion of the fluid.

If the acoustic wave is a travelling wave, the fluid element is incessantly subject to compression and expansion as acoustic waves travel in the fluid. The location of the fluid element along the wall 12b in X direction is different for compression and expansion, that is, the location changes as the fluid longitudinally oscillates.

FIG. 4A illustrates one cycle of compression and expansion of the travelling wave that has a phase difference of a quarter of the cycle period between the sound pressure of the acoustic waves and the displacement of the fluid element. In advance, one of ends of the wall 12b (at location I) is externally heated and the other end of the wall 12b (at location II) is externally cooled to generate a temperature gradient on the wall 12b as illustrated in FIG. 4B. The fluid element at the location I along the wall 12b is under the expansion process, that is, under state A. The fluid element continues the expansion to become state B. During the process, the fluid element receives heat from the high-temperature wall 12b. The fluid element under the state B then starts to move toward the location II along the wall 12b and becomes the most expanded state B'. Under the state B', the fluid element starts compression and becomes state D. During the process, the fluid element supplies heat to the low-temperature wall 12b. The fluid element under the state D then starts to move toward the location I and becomes the most compressed state D'. During the process, the fluid element supplies heat to the wall 12b. As the fluid element receives heat from the wall 12b during the expansion process and the wall 12b takes out heat from the fluid element during the compression process, compression and expansion of the fluid element can be enhanced. By generating the temperature gradient, in advance, on the wall 12b of the thermoacoustic energy converting element part 12, the sound pressure energy of the acoustic waves travelling through the thermoacoustic energy converting element part 12 can be amplified.

In contrast, when no temperature gradient is generated on the wall 12b, the heat is supplied from the high-temperature fluid element to the wall 12b during the compression process, raising the temperature of the wall 12b, and the fluid element takes out heat from the wall 12b during the expansion process, which result in generation of an adverse temperature gradient to the temperature gradient in FIG. 4B on the wall 12b. The thermoacoustic energy converting element part 112 can provide a low temperature or a high temperature using the temperature gradient generated by the sound pressure energy of the acoustic waves travelling through the thermoacoustic energy converting element part 112. For example, the temperature gradient is generated between the location I and the location II along the wall 12b by acoustic waves. If either of the location I and the location II is controlled to be at a constant temperature, the temperature gradient can provide a temperature different from the constant temperature. The thermoacoustic energy converting element part 112 can provide a low temperature or a high temperature using the temperature gradient generated by the sound pressure energy of the acoustic waves travelling through the thermoacoustic energy converting element part 112.

The circulation paths 36 and 136 are preferably formed so that the cycle can be repeated several times, where the aforementioned cycle is determined as one cycle.

The above description is representatively made for the travelling wave. The travelling wave has a phase difference of a quarter of the cycle period between the compression and expansion cycle of the fluid and the displacement cycle of the fluid element. This phase difference causes energy conversion between acoustic waves and heat. In contrast, for the standing wave, there is no phase difference between the cycle of compression and expansion of the fluid and the cycle of displacement of the fluid element, so that energy conversion is not likely to take place. For the standing wave, however, by determining the frequency of acoustic waves considering a delay in energy conversion between the fluid and the wall, the conversion can be performed. The wavelength of the standing wave is determined by the length of the guide tubes 14 and 114 or the circulation paths 36 and 136, and the wavelength determines the frequency of acoustic waves. That is, the frequency of acoustic waves can be controlled by adjusting the length of the guide tubes 14 and 114 or the circulation paths 36 and 136. The delay in energy conversion is determined by thermal conductivity, density, and specific heat at constant pressure of the fluid and the size of the through holes.

To efficiently function the thermoacoustic energy converting element part 12 and the thermoacoustic energy converting element part 112, the energy conversion between acoustic waves and heat is preferably performed at several locations. Furthermore, it is preferable to generate a stable temperature gradient in the thermoacoustic energy converting element part 12 and the thermoacoustic energy converting element part 112.

Therefore, the thermoacoustic energy converting element part 12 and the thermoacoustic energy converting element part 112 according to the embodiment include through holes, in which acoustic waves travel, that have a hydraulic diameter of 0.4 mm or smaller, and an open area ratio of the plurality of through holes in the thermoacoustic energy converting element part 12 and the thermoacoustic energy converting element part 112 is 60% or higher. The number of through holes having the hydraulic diameter of 0.4 mm or smaller is preferably 80% or larger of the total number of through holes, in which acoustic waves travel, in the thermoacoustic energy converting element part 12 and the thermoacoustic energy converting element part 112. Most preferably, all of through holes, in which acoustic waves travel, in the thermoacoustic energy converting element part 12 and the thermoacoustic energy converting element part 112 have a hydraulic diameter of 0.4 mm or smaller. Furthermore, the thermal conductivity of the thermoacoustic energy converting element part 12 and the thermoacoustic energy converting element part 112 in the fluid atmosphere is 0.4 W/m/K or lower at 25° C., and the heat capacity of the thermoacoustic energy converting element part 12 and the thermoacoustic energy converting element part 112 (the heat capacity of 1 cc of the thermoacoustic energy converting element part 112) in the fluid atmosphere at 400° C. is controlled to be higher than 0.5 J/cc/K.

The hydraulic diameter of the through hole is set to 0.4 mm or smaller, because the upper limit of the thickness of the fluid that contributes to the energy conversion between the wall surrounding the through hole and the fluid is 0.2 mm. The hydraulic diameter of the through hole is thus set to 0.4 mm or smaller to improve the efficiency of energy conversion. The hydraulic diameter is a dimension related to a cross section of the through hole taken perpendicular to the extending direction of the through hole and is expressed by 4·S/L mm, where L mm is the outer peripheral length of the cross section and S mm$^2$ is the area of the cross section. The hydraulic diameter of the through hole is preferably 0.2 to 0.3 mm. The hydraulic diameter of the through hole smaller than 0.1 mm is not preferable because the frictional resistance between the fluid and the wall of the through hole becomes large. Therefore, the hydraulic diameter of the through hole is preferably 0.1 mm or larger.

By providing an open area ratio of through holes of 60% or higher to the thermoacoustic energy converting element part 12 and the thermoacoustic energy converting element part 112, the energy conversion between the fluid, in which acoustic waves travel and the wall takes place at further larger number of locations. The open area ratio is the ratio of the total cross sectional area of the through holes to the area inside the outer periphery of the cross section of the thermoacoustic energy converting element part 12 and the thermoacoustic energy converting element part 112 taken perpendicular to the X direction. If the open area ratio is lower than 60%, the area of the travelling route in the thermoacoustic energy converting element part 12 and the thermoacoustic energy converting element part 112 steeply decreases, which may result in the increase in dissipation of acoustic wave energy caused by viscosity of the fluid element. For this reason, the open area ratio is preferably 70% or higher, more preferably, 80% or higher. The upper limit of the open area ratio is, for example, 93%. To increase the open area ratio, the thermoacoustic energy converting element part 12 and the thermoacoustic energy converting element part 112 preferably have a honeycomb structure which enables the wall 12b to be formed thin. For example, the honeycomb structure may be formed by extrusion molding in which the material is extruded along the extending direction of the through holes 12a. The open area ratio is calculated by the formula S2/(S1+S2), where S1 is an area of the material portion and S2 is an area of the opened portion. S1 and S2 are obtained from a photographic image of the cross section (polished surface) taken perpendicular to the through holes in the thermoacoustic energy converting element part 12 and the thermoacoustic energy converting element part 112. The photographic image of the cross section is taken with a microscope.

By controlling the thermal conductivity of the thermoacoustic energy converting element part 12 and the thermoacoustic energy converting element part 112 at 25° C. to be 0.4 W/m/K or lower, the temperature gradient can appropriately be generated in the thermoacoustic energy converting element part 12 and the thermoacoustic energy converting element part 112. When the thermal conductivity is higher than 0.4 W/m/K, the temperature gradient generated between both ends of the thermoacoustic energy converting element part 12 and the thermoacoustic energy converting element part 112 produces heat flux that moderates the temperature gradient, which results in decrease in the energy conversion between acoustic waves and heat. The aforementioned thermal conductivity is the thermal conductivity in the fluid atmosphere. For a porous ceramic part, for example, the thermal conductivity represents not the thermal conductivity of the material itself but the thermal conductivity of the structure including the space in addition to that of the material, such as pores and through holes (also including the fluid in the space). This thermal conductivity can be adjusted to 0.4 W/m/K or lower at 25° C. by combining the thermal conductivity of the material itself with controlled cell density, porosity, or aforementioned open area ratio of through holes. The thermal conductivity is preferably 0.3 W/m/K or lower in that the steeper temperature gradient can be generated. More preferably, the thermal conductivity is 0.2 W/m/K or lower. The lower limit of the thermal conductivity is, for example, 0.005 W/m/K.

The thermal conductivity can be calculated by the temperature gradient method (the steady-state method) as described below. A plate-like TEST sample whose thermal conductivity is to be measured is sandwiched between spacers whose thermal conductivity is known. One of ends of the sandwiching spacers is heated to a certain temperature from 30 to 200° C. while the other end is cooled to a certain temperature from 20 to 25° C. to generate a steady temperature gradient along the thickness direction of the TEST sample. The heat flow is calculated from the temperature gradient in the spacer. The heat flow is divided by the temperature difference to obtain thermal conductivity. More specifically, the thermoacoustic energy converting element part 12 or the thermoacoustic energy converting element part 112 having a diameter of 30 mm and a thickness of 30 mm is used as a TEST sample, and a spacer having a diameter of 30 mm and a length of 150 mm made of stainless steel or copper is used. The temperature distribution in the spacer along the axial direction is measured to obtain the thermal conductivity of the thermoacoustic energy converting element part 12 and the thermoacoustic energy converting element part 112 along the extending direction of the through hole.

The density (cell density) of the through holes is preferably within a range from 1600 cpsi (the number of through holes within one square inch [number of cells]) to 9000 cpsi. By increasing the density of through holes, the fluid loss occurring between the fluid and the thermoacoustic energy converting element part 12 can be suppressed.

The porosity of the material composing the thermoacoustic energy converting element part 12 and the thermoacoustic energy converting element part 112 is preferably 35% or lower, more preferably, 27% or lower. For practical manufacturability, the range is preferably from 0.5% to 35%.

The heat capacity of the structure of the thermoacoustic energy converting element part 12 and the thermoacoustic energy converting element part 112 at 400° C. in the fluid atmosphere is preferably higher than 0.5 J/cc/K. Therefore, even though the temperature of the wall changes by the heat exchanged between the wall and the fluid, the temperature gradient can be kept stable. When the heat capacity of the structure is 0.5 J/cc/K or lower, the temperature of the wall steeply decreases or increases by the heat exchanged between the wall and the fluid, which is not preferable in that the temperature gradient cannot be kept stable. The heat capacity of the structure at 400° C. is preferably 0.61 J/cc/K or higher, more preferably, 0.75 J/cc/K or higher, to further stabilize the thermal gradient. The upper limit of the heat capacity of the structure at 400° C. is, for example, 3 J/cc/K.

The heat capacity of the thermoacoustic energy converting element part 12 and the thermoacoustic energy converting element part 112 can be obtained in the manner described below. First, the heat capacity per unit mass of the material is obtained. Specifically, using crushed powder of the material used for the sample, the heat capacity per unit mass of the material itself is obtained from the relationship between input heat and temperature rise measured with an adiabatic calorimeter. Then by multiplying the mass per unit volume of the non-crushed material used for the sample and the obtained heat capacity per unit mass, the heat capacity per unit volume (1 cc) of the structure is obtained.

The thermal expansion along the extending direction of the through hole in the thermoacoustic energy converting element part 12 and the thermoacoustic energy converting element part 112 under the temperature from 20 to 800° C. is preferably 6 ppm/K or lower. The thermal stress in the thermoacoustic energy converting element part 12 and the thermoacoustic energy converting element part 112 can thus be reduced, which prevents damage caused by thermal strain. More preferably, the thermal expansion along the extending direction of the through holes in the thermoacoustic energy converting element part 12 and the thermoacoustic energy converting element part 112 under the temperature from 20 to 800° C. is 3 ppm/K or lower. The lower limit of the thermal expansion is, for example, 0.2 ppm/K. The thermal expansion along the extending direction of the through holes is measured according to JIS R1618-2002 "Measuring method of thermal expansion of fine ceramics by thermomechanical analysis".

The thermoacoustic energy converting element part 12 and the thermoacoustic energy converting element part 112 are preferably made of a material having a main component selected from cordierite, mullite, aluminum titanate, alumina, zirconia, silicon nitride, silicon carbide, and synthetic resin. The content percentage of the main component in the material is 80% or higher by mass, and maybe 100% by mass. Cordierite, mullite, aluminum titanate, alumina, zirconia, silicon nitride, and silicon carbide are ceramics preferably used in a form of porous ceramic part. For synthetic resin, polyimide may be used.

Figure 5:
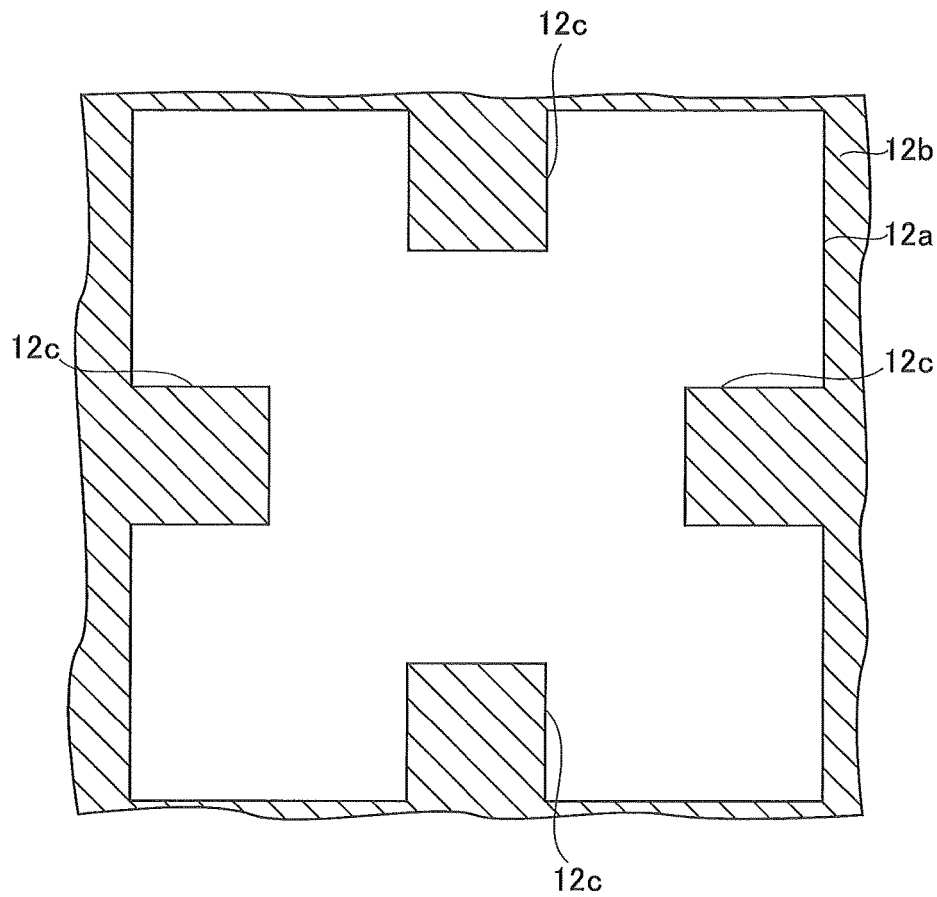
FIG. 5 illustrates an example cross section of a through hole provided in the thermoacoustic energy converting element part according to the embodiment.

The cross section of the through hole provided in the thermoacoustic energy converting element part 12 and the thermoacoustic energy converting element part 112 is, for example, a polygonal shape such as a triangle, a square, and a hexagon. The cross section may be a combined shape of such polygonal shapes. A through hole 12a having a cross section as illustrated in FIG. 5 may also be used. FIG. 5 illustrates an example cross section of the through hole 12a provided in the thermoacoustic energy converting element parts 12 and the thermoacoustic energy converting element part 112. The inner surface of the wall 12b facing the through hole 12a is provided with a rib 12c that extends along the extending direction of the through hole 12a and protrudes inward in a cross sectional view of the through hole 12a. With the rib 12c provided on the wall 12b, the contact area between the fluid, in which acoustic waves travel, and the wall 12b increases. The efficiency of conversion between sound pressure energy and thermal energy can thus be improved. In the example illustrated in FIG. 5, a rib 12c is provided on each of four locations on the inner surface forming a square cross section, although the location and the number of the rib 12c are not particularly limited. The cross section is not limited to a square.

(Exemplary Experiment)

Various types of the thermoacoustic energy converting element part are manufactured to confirm that the energy conversion between the fluid, in which acoustic waves travel, and the wall in the thermoacoustic energy converting element part according to the embodiment is efficiently performed.

To calculate the efficiency of energy conversion, acoustic waves are converted into electric in a linear generator at the output end 14a of the thermoacoustic energy converter 10 illustrated in FIG. 1, and the generated power W J/sec is measured. An input calorie Q J/sec at a high temperature side heat exchanging unit that is transferred to the system is calculated by the formula Q=ΔT·Cp·M, where ΔT is the temperature difference of the gas between the input port and the output port of the high temperature side heat exchanging unit, M kg/sec is the flow rate of the gas, and Cp J/kg/K is the specific heat of the gas. The conversion efficiency q is calculated by the formula η=W/Q. The efficiency of 20% or higher is required to pass the TEST.

The thermoacoustic energy converter 10 has the length of 30 mm in X direction. Helium gas is hermetically contained in the guide tube 14 and kept at 10 atmospheric pressure. The low temperature portion 15 and the high temperature portion 23 of the thermoacoustic energy converting element part 12 are provided with temperatures so as the temperature of the end of the low temperature portion 15 to be 100° C. and the temperature of the end of the high temperature portion 23 to be 450° C.

The thermal expansion along the extending direction of the through hole of Exemplary Embodiments 1 to 10 and Comparative Examples 1 to 12 under the temperature from 20° C. to 800° C. is 1 ppm/K. Exemplary Embodiments 11 and 12 and Comparative Examples 13 and 14 each have the hydraulic diameter of 0.3 mm and the open area ratio of 80%. The material is different among the Exemplary Embodiments and the Comparative Examples, and thus their thermal expansion properties are different. In Exemplary Embodiments 11 and 12 and Comparative Examples 13 and 14, the thermoacoustic energy converting element part is continuously used for five hours under the condition for measuring the conversion efficiency. Whether the result passes the TEST of thermal durability is determined by whether the thermoacoustic energy converting element part is damages.

TABLES 1 and 2 show the efficiency of energy conversion for each case. The hydraulic diameter, the open area ratio, the thermal conductivity, the heat capacity at 400° C., and the thermal expansion from 20° C. to 800° C. listed in TABLES 1 and 2 are parameters already explained.

TABLE 1

| | Hydraulic Diameter mm | Open Area Ratio % | Thermal Conductivity W/m/K | Heat Capacity J/cc/K | Conversion Efficiency % |
|---|---|---|---|---|---|
| Exemplary Embodiment 1 | 0.2 | 80 | 0.4 | 0.61 | 30 |
| Exemplary Embodiment 2 | 0.3 | 80 | 0.4 | 0.61 | 27 |
| Exemplary Embodiment 3 | 0.4 | 80 | 0.4 | 0.61 | 22 |
| Comparative Example 1 | 0.5 | 80 | 0.4 | 0.61 | 9 |
| Comparative Example 2 | 0.6 | 80 | 0.4 | 0.61 | 5 |
| Comparative Example 3 | 1.0 | 80 | 0.4 | 0.61 | 2 |
| Exemplary Embodiment 4 | 0.3 | 60 | 0.4 | 0.61 | 20 |
| Exemplary Embodiment 5 | 0.3 | 70 | 0.4 | 0.61 | 21 |
| Exemplary Embodiment 6 | 0.3 | 80 | 0.4 | 0.61 | 22 |
| Comparative Example 4 | 0.3 | 25 | 0.4 | 0.61 | 2 |
| Comparative Example 5 | 0.3 | 35 | 0.4 | 0.61 | 5 |
| Comparative Example 6 | 0.3 | 55 | 0.4 | 0.61 | 9 |
| Exemplary Embodiment 7 | 0.3 | 80 | 0.2 | 0.61 | 25 |
| Exemplary Embodiment 8 | 0.3 | 80 | 0.4 | 0.61 | 22 |
| Comparative Example 7 | 0.3 | 80 | 0.6 | 0.61 | 10 |
| Comparative Example 8 | 0.3 | 80 | 2.0 | 0.61 | 5 |
| Comparative Example 9 | 0.3 | 80 | 3.0 | 0.61 | 3 |
| Comparative Example 10 | 0.3 | 80 | 6.0 | 0.61 | 1 |
| Exemplary Embodiment 9 | 0.3 | 80 | 0.4 | 0.61 | 22 |
| Exemplary Embodiment 10 | 0.3 | 80 | 0.4 | 0.9 | 23 |
| Comparative Example 11 | 0.3 | 80 | 0.4 | 0.3 | 2 |
| Comparative Example 12 | 0.3 | 80 | 0.4 | 0.5 | 5 |

TABLE 2

| | Thermal Conductivity W/m/K | Heat Capacity J/cc/K | Thermal Expansion ppm/K | Thermal Durability |
|---|---|---|---|---|
| Exemplary Embodiment 11 | 0.2 | 0.61 | 1 | TEST Passed |
| Exemplary Embodiment 12 | 0.2 | 0.61 | 6 | TEST Passed |
| Comparative Example 13 | 0.2 | 0.61 | 6.5 | TEST Failed to Passed |
| Comparative Example 14 | 0.2 | 0.61 | 8 | TEST Failed to Passed |

As can be understood by comparing Exemplary Embodiments 1 to 3 and Comparative Examples 1 to 3 shown in TABLE 1, the conversion efficiency is high when the hydraulic diameter is 0.4 mm or smaller. By comparing Exemplary Embodiments 4 to 6 and Comparative Examples 4 to 6, the conversion efficiency is high when the open area ratio of the through holes is 60% or higher. By comparing Exemplary Embodiments 7 and 8 with Comparative Examples 7 to 10, it can be understood that the conversion efficiency is high when the thermal conductivity is 0.4 W/m/K or lower. By comparing Exemplary Embodiments 9 and 10 with Comparative Examples 11 and 12, it can be understood that the conversion efficiency is high when the heat capacity is higher than 0.5 J/cc/K. In particular, the heat capacity is preferably 0.61 J/cc/K or higher.

Accordingly, high efficiency of energy conversion can be obtained by controlling the hydraulic diameter of the through hole in the thermoacoustic energy converting element part 12 to be 0.4 mm or smaller, the open area ratio of through holes in the thermoacoustic energy converting element part 12 to be 60% or higher, the thermal conductivity of the thermoacoustic energy converting element part 12 in the fluid atmosphere to be 0.4 W/m/K or lower, and the heat capacity of the thermoacoustic energy converting element part 12 at 400° C. in the fluid atmosphere to be higher than 0.5 J/cc/K.

By comparing Exemplary Embodiments 11 and 12 with Comparative Examples 13 and 14 shown in TABLE 2, it can be understood that when the thermal expansion along the extending direction of the through hole under a temperature from 20 to 800° C. is 6 ppm/K or lower, sufficient thermal durability, that is, reduced thermal stress and minimized damage due to thermal strain, can be obtained.

The thermoacoustic energy converting element part and the thermoacoustic energy converter according to the embodiment of the present invention are described above in detail. The present invention is not limited to the embodiments and Exemplary Embodiments described above. Various modifications and alterations can be made without departing from the spirit and the scope of the present invention.

REFERENCE SIGNS LIST

10 thermoacoustic energy converter
12, 112 thermoacoustic energy converting element part
12a through hole
12b wall
14, 114 guide tube
14a output end
15 heat exchanging unit (low temperature portion)
16, 24, 116, 124 supply tube
18, 26, 118, 126 ejection tube
20, 28, 120, 128 annular tube
21, 29, 121, 129 metal member
22, 122 cooling fin
23 heat exchanging unit (high temperature portion)

30 heating fin
32, 132 insulation member
34, 134 casing
36, 136 circulation path
40 converting unit
115 heat output unit
123 heat exchanging unit
130 fin

The invention claimed is:

1. A thermoacoustic energy converting element part that converts acoustic energy into thermal energy or thermal energy into acoustic energy between a fluid, through which acoustic waves travel, and a wall in contact with the fluid, the thermoacoustic energy converting element part comprising:
a wall extendingly surrounding each of a plurality of through holes and configured to exchange heat with the fluid, the plurality of through holes penetrating the thermoacoustic energy converting element part to extend in a direction and serving as travelling routes of acoustic waves, wherein
the plurality of through holes includes a through hole having a hydraulic diameter of 0.4 mm or smaller,
an open area ratio of the plurality of through holes in the thermoacoustic energy converting element part is 60% or higher,
wherein the thermoacoustic energy converting element part satisfies all of the following conditions:
a thermal conductivity of the thermoacoustic energy converting element part in fluid atmosphere is 0.4 W/m/K or lower,
a heat capacity of the thermoacoustic energy converting element part at 400° C. in the fluid atmosphere is higher than 0.5 J/cc/K and equal to or lower than 3 J/cc/K, and
a thermal expansion along an extending direction of the plurality of through holes in the thermoacoustic energy converting element part under temperature from 20 to 800° C. is 6 ppm/K or lower, and
wherein the thermoacoustic energy converting element part is made of a material containing 80% or higher by mass of a component selected from cordierite, mullite, aluminum titanate, alumina, zirconia, silicon nitride, and silicon carbide.

2. The thermoacoustic energy converting element part according to claim 1, wherein a cross section of each of the through holes in the thermoacoustic energy converting element part taken perpendicular to the extending direction of the through hole has a polygonal shape.

3. The thermoacoustic energy converting element part according to claim 1, wherein an inner face of the wall facing the through hole is provided with a rib extending along the extending direction of the through hole and protrudes inward in a cross sectional view of the through hole.

4. The thermoacoustic energy converting element part according to claim 1, wherein heat capacity of the thermoacoustic energy converting element part at 400° C. in the fluid atmosphere is 0.75 J/cc/K or higher.

5. The thermoacoustic energy converting element part according to claim 1 is configured as a single structure.

6. The thermoacoustic energy converting element part according to claim 1, the thermoacoustic energy converting element part configured as an elongated single structure formed of a single material and including a wall parting through holes each serving as a flow path extending from one end to another end of the thermoacoustic energy converting element part.

7. The thermoacoustic energy converting element part according to claim 1, wherein the plurality of through holes include at least one through hole that has a hydraulic diameter of from 0.2 mm to 0.4 mm.

8. The thermoacoustic energy converting element part according to claim 1, wherein a cell density of the plurality of through holes is in a range of from 1600 cpsi to 9000 cpsi.

9. The thermoacoustic energy converting element part according to claim 1, wherein the thermoacoustic energy converting element part is made of ceramic, and a porosity of the ceramic is from 0.5% to 35%.

10. The thermoacoustic energy converting element part according to claim 1, wherein the thermoacoustic energy converting element part includes a single material that satisfies all of the thermal conductivity, heat capacity and thermal expansion conditions.

11. The thermoacoustic energy converting element part according to claim 1, wherein the plurality of through holes are distributed homogenously in the thermoacoustic energy converting element part.

12. A thermoacoustic energy converter configured to amplify acoustic wave energy in a fluid using heat of a wall in contact with the fluid, the thermoacoustic energy converter comprising:
a thermoacoustic energy converting element part;
a guide tube forming a travelling route of acoustic waves travelling in the fluid and configured to guide the acoustic waves to through holes in the thermoacoustic energy converting element part so as the acoustic waves travel along an extending direction of the through holes; and
a pair of heat exchanging units provided on both ends of the thermoacoustic energy converting element part and configured to generate temperature gradient along the extending direction between both ends of the thermoacoustic energy converting element part, wherein
the guide tube includes an output end which is configured to output acoustic waves having sound pressure energy amplified by using the temperature gradient and to be coupled to a converter configured to convert resulting amplified sound pressure energy of output acoustic waves into other form of energy,
the thermoacoustic energy converting element part includes a wall extendingly surrounding each of a plurality of the through holes and configured to exchange heat with the fluid, the plurality of through holes penetrating the thermoacoustic energy converting element part to extend in a direction and serving as travelling routes of acoustic waves,
the through holes include a through hole that has a hydraulic diameter of 0.4 mm or smaller,
an open area ratio of the plurality of through holes in the thermoacoustic energy converting element part is 60% or higher,
wherein the thermoacoustic energy converting element part satisfies all of the following conditions:
a thermal conductivity of the thermoacoustic energy converting element part in fluid atmosphere is 0.4 W/m/K or lower,
a heat capacity of the thermoacoustic energy converting element part at 400° C. in the fluid atmosphere is higher than 0.5 J/cc/K and equal to or lower than 3 J/cc/K; and
a thermal expansion along an extending direction of the plurality of through holes in the thermoacoustic energy converting element part under temperature from 20 to 800° C. is 6 ppm/K or lower, and wherein the thermoacoustic energy converting element part is made of a material containing 80% or higher by mass of a component selected from cordierite, mullite, aluminum titanate, alumina, zirconia, silicon nitride, and silicon carbide.

13. The thermoacoustic energy converter according to claim 12, wherein the thermoacoustic energy converting element part includes a single material that satisfies all of the thermal conductivity, heat capacity and thermal expansion conditions.

14. The thermoacoustic energy converter according to claim 12, wherein the plurality of through holes are distributed homogenously in the thermoacoustic energy converting element part.

15. A thermoacoustic energy converter configured to generate temperature gradient on a wall in contact with a fluid by using acoustic wave energy in the fluid, the thermoacoustic energy converter comprising:
- a thermoacoustic energy converting element part;
- a guide tube forming a travelling route of acoustic waves travelling in the fluid and configured to guide the acoustic waves to through holes in the thermoacoustic energy converting element part so as the acoustic waves travel along an extending direction of the through holes; and
- a heat exchanging unit provided on a first end of the thermoacoustic energy converting element part and kept at a constant temperature; and
- a heat output unit provided on a second end of the thermoacoustic energy converting element part and configured to provide a temperature different from the temperature of the heat exchanging unit by using a temperature gradient generated in the thermoacoustic energy converting element part between the heat exchanging unit and the heat output unit by travelling of the acoustic waves, wherein the thermoacoustic energy converting element part includes a wall extendingly surrounding each of a plurality of the through holes and configured to exchange heat with the fluid, the plurality of the through holes penetrating the thermoacoustic energy converting element part to extend in a direction and forming travelling routes of acoustic waves, the through holes include a through hole that has a hydraulic diameter of 0.4 mm or smaller, an open area ratio of the plurality of the through holes in the thermoacoustic energy converting element part is 60% or higher, wherein the thermoacoustic energy converting element part satisfies all of the following conditions:

a thermal conductivity of the thermoacoustic energy converting element part in fluid atmosphere is 0.4 W/m/K or lower, a heat capacity of the thermoacoustic energy converting element part at 400° C. in the fluid atmosphere is higher than 0.5 J/cc/K and equal to or lower than 3 J/cc/K; and a thermal expansion along an extending direction of the plurality of through holes in the thermoacoustic energy converting element part under temperature from 20 to 800° C. is 6 ppm/K or lower, and wherein the thermoacoustic energy converting element part is made of a material containing 80% or higher by mass of a component selected from cordierite, mullite, aluminum titanate, alumina, zirconia, silicon nitride, and silicon carbide.

16. The thermoacoustic energy converter according to claim 15, wherein the thermoacoustic energy converting element part includes a single material that satisfies all of the thermal conductivity, heat capacity and thermal expansion conditions.

17. The thermoacoustic energy converter according to claim 15, wherein the plurality of through holes are distributed homogenously in the thermoacoustic energy converting element part.

* * * * *